S. SIGAL.
MALTED MACHINE.
APPLICATION FILED JULY 15, 1921.
1,418,099.
Patented May 30, 1922.
2 SHEETS—SHEET 1.
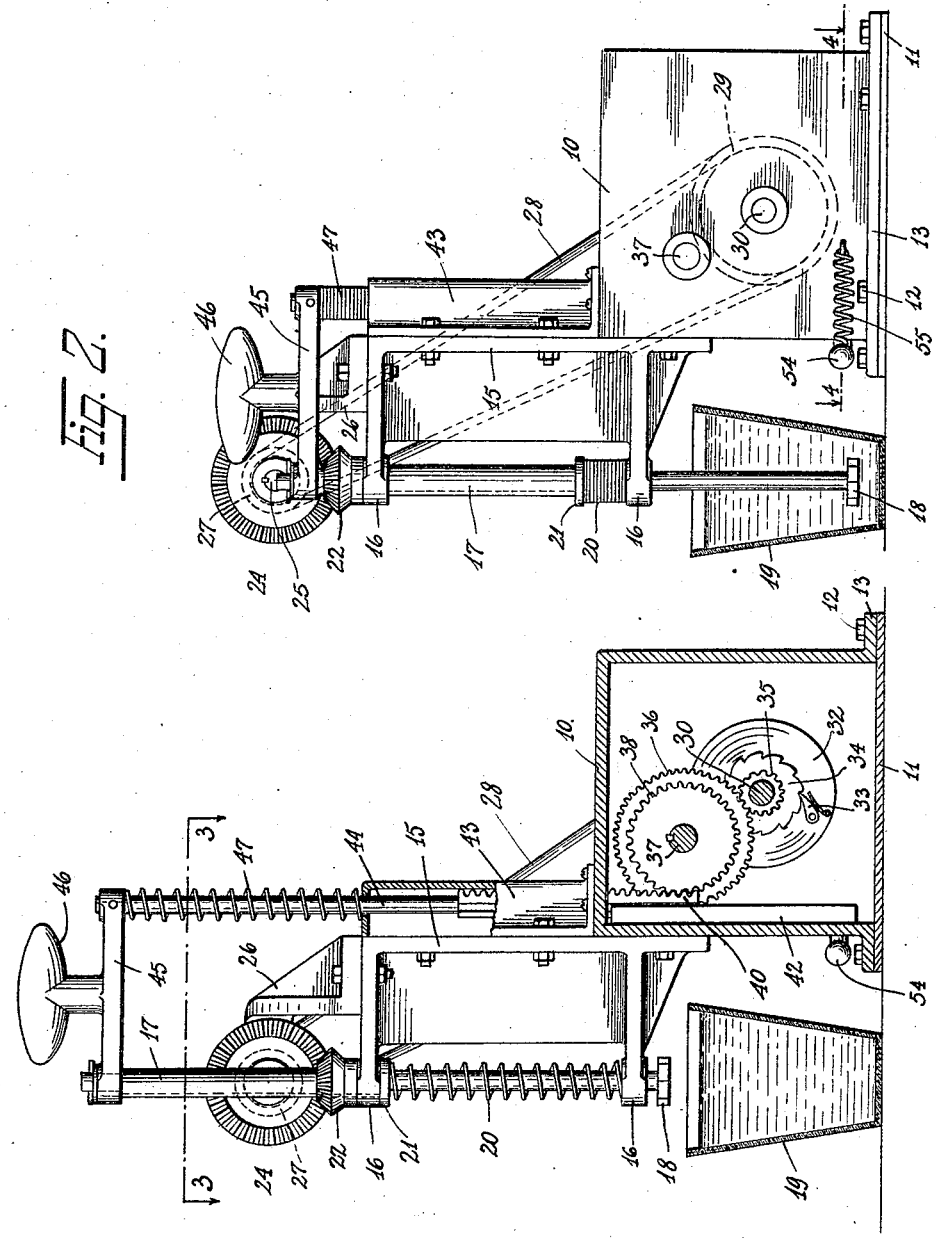
INVENTOR.
Soloman Sigal
BY
Richards Geier
ATTORNEYS.

S. SIGAL.
MALTED MACHINE.
APPLICATION FILED JULY 15, 1921.
1,418,099.
Patented May 30, 1922.
2 SHEETS—SHEET 2.
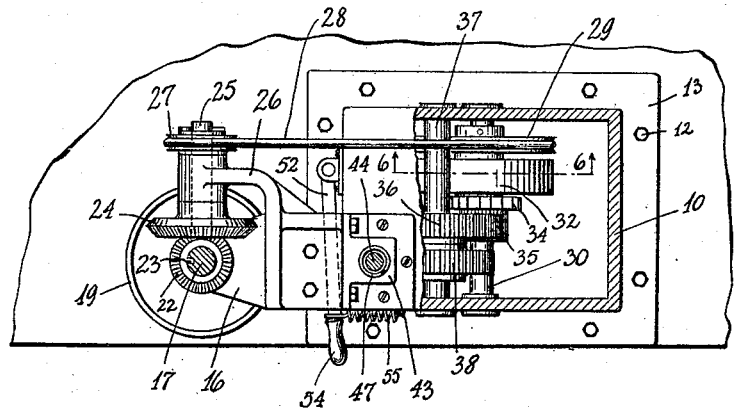
Fig. 3.
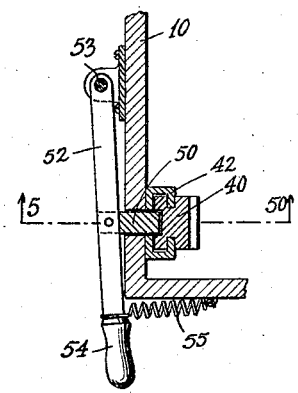
Fig. 4.
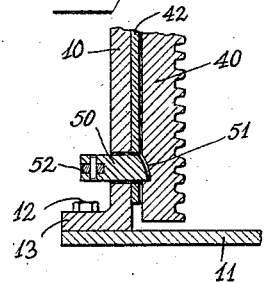
Fig. 5.
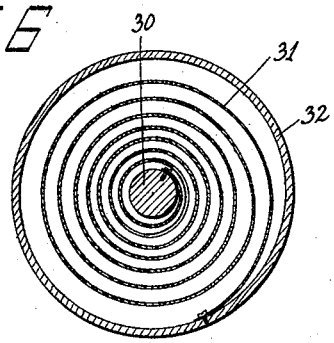
Fig. 6.
Fig. 7.
INVENTOR.
Soloman Sigal
BY
ATTORNEYS.

UNITED STATES PATENT OFFICE.

SOLOMAN SIGAL, OF BROOKLYN, NEW YORK.

MALTED MACHINE.

1,418,099.   Specification of Letters Patent.   Patented May 30, 1922.

Application filed July 15, 1921. Serial No. 484,901.

*To all whom it may concern:*

Be it known that I, SOLOMAN SIGAL, citizen of Russia and resident of Brooklyn, in the county of Kings and State of New York, have invented certain new and useful Improvements in Malted Machines, of which the following is a specification.

This invention relates to a drink mixer having more particular reference to a drink mixer arranged to be driven by a spring motor.

The invention has for a general object to provide a simple and inexpensive mixer which may be driven without the use of external power.

More specifically speaking, the invention has for an object to simplify the winding of the motor spring so that the winding thereof does not require the manipulation of extra parts.

For further comprehension of the invention, and of the objects and advantages thereof, reference will be had to the following description and accompanying drawings, and to the appended claims in which the various novel features of the invention are more particularly set forth.

Fig. 1 of the drawings is a vertical sectional view of a drink mixer constructed according to the invention, showing the paddle in its raised position.

Fig. 2 is a side view, with the paddle depressed.

Fig. 3 is a horizontal section on the line 3—3 of Fig. 1.

Fig. 4 is a fragmentary horizontal section, taken on the line 4—4 of Fig. 2, and illustrating particularly the means for holding the paddle in its lowered position.

Fig. 5 is a vertical section on the line 5—5 of Fig. 4.

Fig. 6 is a fragmentary sectional view, illustrating the spring motor, this view being taken along the line 6—6 of Fig. 3.

Fig. 7 is a view showing a modified arrangement whereby the mixer shaft is automatically locked while being moved downward.

Referring to the drawings, the numeral 10 indicates a rectangular casing which contains the spring motor and serves as a base or support for the mixing or stirring elements. This casing may have a removable bottom 11 which is secured in place by screws 12 passing through a base flange 13 on the casing. These screws may also serve to fasten the device on a table or like support.

Bolted or otherwise secured to the casing 10, and extending above and to one side thereof, is a bracket 15 presenting a pair of vertically spaced bearing elements 16. Journaled in these bearing elements is a vertical shaft 17 which has a rotary paddle or stirrer 18 on its lower end. This shaft 17 is adapted to have longitudinal as well as rotary movement so as to move the paddle 18 into or out of the vessel, such as indicated at 19, containing the liquid to be stirred or mixed.

To this end the shaft 17 is made considerably longer than the distance between the bearings 16 and is normally held in raised position by means of a coiled expansion spring 20 surrounding the shaft between the two bearings 16 and engaged between the lower bearing and a collar 21 fixed on shaft 17, engagement of this collar with the upper bearing 16 limiting upward movement of the shaft 17. Swiveled in the upper bearing 16 is a small bevel gear 22 which is connected to shaft 17 by a feather 23, this gear 22 meshing with a large gear 24 on a stub shaft 25 journaled in an extension 26 of the bracket 16. Fixed on this stub shaft 25 is a small pulley 27 connected by a belt 28 with a larger pulley 29 fixed to the main shaft of the motor.

The main shaft of the motor is shown at 30 and is suitably supported in the casing 10. To this shaft 30 is fixed one end of a clock spring 31 whose other end is fixed to an enclosing drum 32 loose on shaft 30. Mounted on the drum 32 is a pawl 33 which engages a ratchet wheel 34 also loose on shaft 30 and having fixed thereto a gear pinion 35. This pinion 35 meshes with a large gear 36 fixed on another shaft 37 journaled in the casing 10, this shaft 37 having fixed thereon a second smaller gear 38 which meshes with a vertically reciprocable rack-bar 40. As will be apparent, downward movement of rack 40 will act to wind the clock spring 31, through ratchet wheel 34, pawl 33 and drum 32.

This rack-bar 40 connected to the vertical shaft 17 so that when the latter is moved downward to bring the paddle 18 into the liquid the spring 31 will be wound. As here shown the rack 40 is guided in a guide member 42 fixed in the casing 10, the rack extending upwardly through a suitable opening in the casing, a housing 43 being secured to the bracket 15 to enclose the upper end of the rack. Extending rigidly upward from the rack-bar is a rod 44 which passes through a suitable opening in the upper end of the housing and is fixed at its upper end to one end of a yoke-bar 45 having the shaft 17 connected to its opposite end by a suitable swivel connection. Mounted on the yoke-bar 45 midway between its ends is a knob or handle 46. Surrounding the rod 44, and bearing upwardly against the yoke-bar 45, is a coiled expansion spring 47 which co-operates with the spring 20 in keeping the parts in their raised positions.

When rack 40 is lowered it is automatically engaged and held lowered by a latch bolt 50 slidable in the wall of casing 10, the rack having a notch 51 in which the bolt engages. This bolt is attached to an arm 52 pivoted at one end as at 53 to the casing wall and having a handle 54 on its other end. A tension spring 55 normally urges the bolt 50 to locking position.

As will be apparent, when rack 40 is moved downward and spring 31 starts winding there is an immediate torque on shaft 30 acting to rotate the latter and also to drive shaft 17, through the pulley 29, belt 28, pulley 27 and bevel gears 24 and 22. This, however, is not generally disadvantageous since the paddle 18 is immersed in the liquid almost as soon as the downward movement commences, while the multiplying connection between shaft 30 and shaft 17 and the resistance offered by the liquid will have a braking action on shaft 17 and allow the spring to wind.

I may, however, employ the device shown in Fig. 7 to hold shaft 17 against rotation when the spring 31 is being wound. As shown in this figure the vertical shaft 17 has fixed to the upper end thereof a disk 60 having a serrated or roughened upper face. This face is adapted to be engaged by a like face on a finger 61 projecting rigidly from a stud 62 slidable in a boss 63 on the yoke-bar 45 and having a knob or handle 64 on its upper end. The finger 61 projects through a vertical slot 65 in the boss. The finger 61 is normally held out of contact with the disk 60 by means of a comparatively light expansion spring 66 coiled around the stud 62 and bearing between the boss 62 and the knob 64. Upward movement of the stud 66 is limited by a collar 67 on the lower end thereof engaging the yoke-bar 45. When the knob 64 is depressed spring 66 will yield before springs 20 and 47 commence to do so, bringing finger 61 into contact with disk 60 and preventing rotation of shaft 17.

It is believed that the manner of operation of my improved mixer will be readily understood from the above description. When the knob is depressed, the paddle is lowered into the liquid, while rack-bar 40 acts to wind spring 30, causing shaft 31 to drive the paddle shaft 17, the paddle being retained in its lowered position by the engagement, automatically effected, of the bolt 50 with the notch 51 in rack-bar, this bolt being released when desired by pulling handle 54, the springs 20 and 47 raising the shaft 17 and rack-bar 40 and the parts carried thereby, pawl 33 riding freely over ratchet wheel 34 during this backward movement.

I preferably provide an automatic release for the latch and stop for the motor. This comprises a worm pinion 70 fixed on shaft 30 and meshing with a worm gear 71 fixed on a vertical shaft in box. Worm gear 71 carries pin 72 which is adapted to engage one end of a jointed thrust bar 73 whose opposite end engages and moves lever 54. The hinged element 73' of this thrust bar 73 has a slot and pin connection with one end of a bolt 74 extending transversely to the thrust bar and projecting into the path of pin 72 being normally held in this position by a coiled expansion spring 75. The pin 72 first engages and moves the thrust bar 73 to release latch and then is stopped by bolt 74. The shaft 30 may then be released when desired by pulling bolt 74 which has a projecting handle 74' spring 55 throwing the thrust bar 73 back to its initial position, except that it is swung outwardly to lie along the pin 72 allowing the latter to move forward.

Having thus described my invention what I claim as new and desire to protect by Letters Patent of the United States is as follows:

1. A device of the class described, comprising a vertical shaft mounted for rotative and longitudinal movement, a paddle fixed thereto, a motor spring, a drive connection between said spring and shaft, and means connecting the spring and shaft whereby longitudinal downward movement of said shaft winds said spring.

2. A device of the class described, comprising a vertical shaft mounted for rotative and longitudinal movement, a paddle fixed thereto, a motor spring, a drive connection between said spring and shaft, and means whereby longitudinal downward movement of said shaft winds said spring, said means including a rack-bar movable with said vertical shaft, a shaft to which one end of said spring is connected, a drum to which the other end of the spring is attached, and a multiplying gear connection between said rack-bar and drum.

3. A device of the class described comprising a vertical shaft and a vertical rack-bar, a paddle mounted on the lower end of said shaft, a yoke-bar connecting the upper ends of said shaft and rack-bar, a motor spring, a drive connection between said spring and shaft, a winding connection between said rack-bar and spring, and an automatically engaging latch device adapted to hold said first shaft in lowered position.

4. A device of the class described comprising a vertical shaft and a vertical rack-bar, a paddle mounted on the lower end of said shaft, a yoke-bar connecting the upper ends of said shaft and rack-bar, a motor spring, a drive connection between said spring and shaft, a winding connection between said rack-bar and spring, and an automatically engaging latch device adapted to hold said first shaft in lowered position, and a spring urging said first shaft and rack-bar to raised position.

5. A device of the class described comprising a vertical shaft mounted for rotative and longitudinal movement, a paddle fixed thereto, a motor spring, a drive connection between said spring and shaft including a gear feathered on said shaft, and means whereby longitudinal downward movement of said shaft winds said spring.

6. A device of the class described comprising a casing, a bracket mounted on said casing, a vertical shaft mounted in said casing to have rotative and longitudinal movement, a vertical rack-bar guided in said casing, a clock spring in said casing, a drive shaft to which one end of said spring is connected, a gear swiveled in said bracket and having a feather connection with said first shaft, an operative connection between said drive shaft and gear, a drum to which the other end of said spring is connected, and a multiplying gear connection between said rack-bar and drum.

7. A device of the class described comprising a casing, a bracket mounted on said casing, a vertical shaft mounted in said casing to have rotative and longitudinal movement, a vertical rack-bar guided in said casing, a clock spring in said casing, a drive shaft to which one end of said spring is connected, a gear swiveled in said bracket and having a feather connection with said first shaft, an operative connection between said drive shaft and gear, a drum to which the other end of said spring is connected, and a multiplying gear connection between said rack-bar and drum, springs normally urging said vertical shaft and rack-bar upwardly, and a latch device retaining said parts in lowered position.

8. A device of the class described comprising a vertical shaft, mounted for rotative and longitudinal movement, a paddle fixed thereto, a motor spring, a drive connection between said spring and said shaft, means whereby longitudinal downward movement of said shaft winds said spring, and means for locking said vertical shaft against rotation when said spring is being wound.

9. A device of the class described comprising a vertical shaft mounted for rotative and longitudinal movement, a paddle fixed thereto, a motor spring, a drive connection between said spring and said shaft, means whereby longitudinal downward movement of said shaft winds said spring, a handle having a lost motion connection with said shaft, and a part carried by said handle and adapted to engage and lock said shaft.

Signed at New York, in the county of New York and State of New York, this thirteenth day of July, A. D. 1921.

SOLOMAN SIGAL.